UNITED STATES PATENT OFFICE.

WILLIAM E. GIESECKE, OF NEW YORK, N. Y., ASSIGNOR TO RAY BROS. CORPORATION, OF NEW YORK, N. Y., A CORPORATION OF NEW YORK.

PROCESS OF LEACHING AND OBTAINING NITRATES AND CHLORIDS.

1,357,973. Specification of Letters Patent. Patented Nov. 9, 1920.

No Drawing. Application filed March 27, 1917. Serial No. 157,651.

*To all whom it may concern:*

Be it known that I, WILLIAM E. GIESECKE, a citizen of the United States, and resident of New York city, borough of Manhattan, in the county of New York and State of New York, have invented certain new and useful Improvements in Processes of Leaching and Obtaining Nitrates and Chlorids, of which the following is a specification.

My invention relates to a new and improved method or process of obtaining commercial sodium nitrate from "caliche" or similar material, together with sodium chlorid as a by-product, and at the same time producing distilled water from ordinary water partly used in leaching.

Caliche is the name of a dry raw material containing sodium nitrate and chlorid in sufficient quantities to warrant its treatment for their extraction therefrom for commercial purposes. It is found in large deposits in the Republic of Chile, South America, and similar material is found in other parts of the world. Raw material, such as caliche, generally contains a number of other salts besides those above named. The nitrate and chlorid of potassium may be present, and possibly other salts, such as chlorids, sulfates, borates, sulfids, carbonates, iodates and iodids of other bases or metals. These latter salts, if present, generally exist in small quantities only, comparatively speaking.

So far as I am aware it is customary to leach the aforesaid raw material with a hot solution at, or near, the boiling point of the solution. This is expensive and also has the disadvantage of leaching from the raw material considerable other undesired salts which must be discarded or precipitated from the solution. This latter is done by hot super-saturation causing the precipitation of sodium chlorid mainly, as well as other salts, but always accompanied with nitrate. During leaching fine insolubles settle to the bottom of leaching tank charged with the solution, containing nitrate mainly, all of which stays with the so-called or termed "ripio" discarded as leached material. This explains why now produced and discarded residue is so rich in nitrate, and yet, though rich, cannot be worked to commercial advantage by the process now employed. During hot leaching chemical reactions take place frequently causing the liberation of iodin when this non-metal is present in some combination or other and loss of nitrate is also caused by these chemical changes.

A leading object of my invention is to practically completely leach from the above named raw material all of the following salts it may contain, sodium nitrate and chlorid, potassium nitrate and chlorid, without the application of artificial heat, thereby leaching out a minimum of undesired salts present; a further object is to so secure from the so-above obtained solution the desired commercial nitrate; or, to even secure a further and more complete isolation of the salts mentioned than mere commercial nitrate alone would require.

A further object of my invention is to disintegrate the said raw material by, and during, leaching, and dissolve salts contained therein while in a cold state without the requirement to resort to mechanical crushing or grinding after mining.

A further object of my invention is to utilize, in the tanks in which the disintegration of the raw material and its leaching are effected, the coarse raw material and its disintegrated parts, partly or wholly leached, as a filter medium for the solution resulting from such disintegration and leaching.

A further object of my invention is to cause agitation of the leaching agent with which the aforesaid dry material is mixed, by means of compressed gas, (such as air), or water or both, for the purpose of aiding in the disintegration of the raw material, and to cause, during such disintegration, all particles of salts contained to come in contact with the leaching agent, and, if soluble at that temperature, to pass into solution. Air forced into the solution acts as an oxidizing agent and as such will tend to clarify the solution by precipitation of certain always present but detrimental compounds or salts.

A further object of my invention is to economize in the consumption of water, thus:—by forcing it out of the voids of the solids by pressure or vacuum, or both, before discarding the leached material as such; by avoiding the loss of water through evaporation by artificial heat during leaching, and by condensing all vapors of evaporation during agitation and crystallization.

In the present process, and as now employed, no efforts are made to regain vapors escaping during leaching or crystallization and the consequent loss of water is excessive.

My new improved process embodies the following leading features: leaching and disintegration of the raw material without the application of artificial heat; the evaporation of the solution, resulting from the preceding, to obtain therefrom salts contained therein, in a mechanically mixed state; the fractional dissolving of such salts in pure water for the production of a solution thereof, and the fractional crystallization of salts therefrom, to obtain commercial sodium nitrate or nearly complete isolation, technically so, of all the salts, is desired.

My improved process may be carried out as follows: Raw material or caliche is first leached in any suitable leaching tank, which, by preference, will be charged with a suitable quantity of liquid, such as ordinary water, as a leaching agent, into which the raw material is deposited. Such raw material need not be crushed or ground as is required with the present process but may be charged as it comes from the mines, that is, in sizes not too heavy to be conveniently handled by laborers. Such raw material is charged into a tank containing liquid where the raw material distributes itself and mixes with said liquid therein to some extent and also absorbs some liquid. While the raw material is being deposited in the tank the liquid therein, by preference, may be agitated by blowing air, or water, or both, into the charge, from below preferably, thereby causing nearly all the raw material to be held in suspension and inducing attrition which again causes more violent disintegration of the raw material. Agitation may be kept up for any desired period, as well as in various degrees of violence, until as complete disintegration as possible of the raw material is attained. After the desired extent of disintegration, or leaching, or both, has been attained the charge is allowed to settle to suit requirements. After agitation and during settling of the charge the material will be deposited in layers according to the respective specific gravity of particles in each layer. In a settled leacher or tank the coarsest and heaviest isolated particles, mixed or not, as the case may be, with unleached intact pieces of virtually raw material, will have settled as the bottom layer or layers; they will be covered with layers of finer material caused by disintegration. The solution containing the salts dissolved from such material will mainly accumulate over the deposited material as well as fill the voids of the deposited layers. Exceedingly fine insoluble material may be found in suspension in the accumulated liquid or solution which is forced or drawn from the tank through the voids of the settled solids, and the solids will serve as a filter medium for the solution. The solution may be further filtered through any other suitable filter. Should the coarsest product of disintegration of the raw material be too fine to serve as a filter medium then suitably selected coarse sand or similar material may be charged in the tank with the raw material to further serve as a filter medium. By the above means the finest, most difficult to leach insolubles, isolated by disintegration, are perfectly leached and so remain. They are mainly deposited on top of the drained solids remaining in the tank, and are partly left in the voids of coarser material as the solution carrying them passes through said voids. A great advantage is that they are deposited in the same tank in which they are generated and will thus not accumulate to become more and more difficult and expensive to handle. After the tank is completely drained of all liquid the leached material is discharged therefrom.

Throughout the foregoing operation no artificial heating is resorted to but the operation is carried out entirely at ordinary normal temperatures. At this temperature the mainly desired salt (sodium nitrate) is readily soluble. Potassium nitrate and chlorid as well as the sodium chlorid will also go into solution at this temperature.

It may be here stated that if the aforesaid solution is not sufficiently saturated with the desired salt or salts, said solution may be used as a leaching agent in connection with fresh raw material in the same tank, or in another tank, and it may be reemployed as a leaching agent as many times as desired until the desired degree of saturation is attained. Also, that if the aforesaid drained, or partly so, raw material is not completely leached by the first application of the leaching agent other fresh leaching agent may be resorted to as often as may be desired to secure the complete, or nearly so, as desired, leaching. Such fresh leaching agent may be forced through the deposited and previously drained partly leached raw material in the tank from below upward, whereby further saturation of an undersaturated solution or releaching or further leaching of raw material is effected. During such further saturation of said under-saturated solution, or releaching, or further leaching of raw material, it is preferable, if not essential, to cause agitation of the solution and the material to be leached, by forcing air or water, or both, through the charge from below upward. The charge is then allowed to settle and the solution is drained through the settled material as a filter bed, in the manner previously described, and such operations may be repeated, as before stated and explained, as many times as may be required or desired.

It may also be stated here that for sake of efficiency and economy a number of such suitable leaching tanks should preferably be installed and operated in a battery or series, so that while one tank is being charged with fresh raw material another may be emptied of its leached contents while others are producing leached material, or are saturating solutions, or both. When a battery of such tanks are employed the leanest solution, preferably pure water, should always first be applied to the leanest or mostly leached raw material. By using pure water for the last leaching practical complete leaching will be assured.

When the solution, obtained as aforesaid in a cold state, is saturated to the desired degree it may be run into a settling tank and allowed to settle for such a period of time as will permit clarification. Such solution, completely or only partially saturated, while in the settling tank may be treated in any desired manner to aid in the separation or precipitation of possibly present undesired compounds, salt or salts.

The aforesaid clarified solution, saturated or not, preferably the former, is next to be evaporated to obtain the salt or salts it contains in the form of independent, isolated crystals. For such purpose the solution is next run or transferred from the settling tank into a suitable evaporator, preferably vacuum pans of a wellknown proven efficient type, and the various salt crystals mechanically mixed, will be removed together, to be stored and drained together. Other salts of other bases may be made to stay in the mother liquor resulting from such evaporation in the evaporating pans.

While evaporation is being carried on all resulting vapors are continually condensed into distilled water which may be stored, and may be used for the final leaching step, or otherwise used.

The mechanical mixture of salts obtained by evaporation as described above is continually removed from the evaporator and allowed to drain. The mixture consists chiefly of sodium nitrate and chlorid. Potassium chlorid and nitrate may also be present to a small extent. As the evaporation of the solution progresses additional solution may be supplied, and all salt crystals formed and dropped are removed continually from the pans without breaking the vacuum.

From the above it will be seen that the resulting mechanical mixture of salts obtained through evaporation of the solution produced by leaching at cold or normal temperature must consist mainly of nitrate and chlorid of sodium; because, oxidation, chemical treatment, filtration, precipitation, clarification, and residue solution (mother liquor) have all been resorted to in due and proper time and may be resorted to repeatedly to cause recovery of virtually only the nitrate and chlorid of sodium.

Fractional solution and crystallization is next resorted to in order to separate the sodium chlorid from the sodium nitrate, or vice versa, to any extent that may be desired. This operation is based on the difference of solubility of the said two salts, even when in solution together, at "extremes" of temperatures. By "extremes" is meant that temperature at which the solution will boil, such as 245° F., and that to which it will cool when exposed to normal atmospheric temperature, say 68° F. A saturated solution of sodium nitrate and chlorid at 68° F. will contain, in round numbers, per 100 parts of pure water, 25 parts of chlorid and 60 parts of nitrate, while at 245° the proportion will be about 15 to 220.

For fractional solution and crystallization the said obtained and mechanically mixed salts are to be dissolved in a suitable quantity of distilled water to form a concentrated or saturated solution thereof. It is gradually raised to the boiling point while said mixed and to be separated salts are added to the solution, and later the solution is allowed to gradually cool. While the solution is being brought to its boiling point the chlorid will continually, to some extent, drop out, at the same time the nitrate will be dissolved more and more and to a much larger extent, due to the increasing affinity of the solution for nitrate as its temperature is being raised. The chlorid, as it forms and drops out, during this heating, is constantly removed. While the solution is at its boiling point all remaining salt crystals in the bottom of the vessel containing the solution are removed. At its boiling point a saturated solution, produced by reason of the aforesaid continued addition of mixed salts during heating, will carry approximately 15 times as much nitrate as chlorid. The solution is then allowed to cool gradually. As it cools it loses affinity for nitrate and drops it in proportion to its cooling; at the same time it develops affinity for chlorid. All nitrate as dropped is continually removed from the vessel. After the solution has been taken through such a cycle it will have dropped approximately 40% of its contained chlorid during heating and approximately 75% of its nitrate during cooling. The above referred to vessel must be equipped with proper and suitable agitation device or devices besides heating and cooling devices. Both during the heating and cooling periods the upper portion of the solution, and especially so its surface, must be kept in constant violent agitation for obvious reasons. The so remaining partly-saturated cooled solution may be again heated in the presence of more of the added first obtained mixed and to be separated salts, and the process repeated as above explained.

The fractional solution and crystallization can be carried on with very little loss of water by condensing the vapors resulting from the heating, and a minimum or no loss of salts results, while the heating, cooling and agitation may all be carried on very economically in the above referred to vacuum pans of a well known proven efficient type.

If technically pure nitrate or chlorid, or both, are desired they can be produced by repetition of fractional solution and crystallization on the first, second, third, or any subsequent product or products of this fractional solution and crystallization step.

From the foregoing description of my improved process of cold solution for the extraction of nitrates from caliche it will be seen that I am enabled to leach caliche without the use of artificial heat, whereby successive leachings may be carried out, in one or more leaching tanks, to obtain practically complete leaching of caliche or other similar raw material, with the consequent reduction of detrimental salts carried into the solution by reason of the cold leaching as is apparent, with the further advantage of less always detrimental activity of borates, iodates, and iodids (generally met with to some extent in all caliche) by reason of cold leaching as compared to hot leaching, and evaporation and crystallization, at much lower temperature than now practised. Further advantages of my process are as follows: The formation of a filter bed out of the products of disintegration through which the solution can be filtered, whereby a greater amount of minute insolubles, usually carried in suspension, are removed from the solution. The practically complete draining of all liquid from the residue material by air pressure, through which the solution or liquid is filtered, with the possible economical mechanical recovery of all unleached intact caliche since the same may be recovered from the thoroughly disintegrated and leached material. No heat is lost when leached material is discarded and very little liquid remains in such residue. Aeration of the solutions as carried out while they are being made oxidizes and causes chemical precipitation of certain undesirable compounds, while the solutions are settling, and the consequent elimination of certain undesired salts before final vacuum evaporation is effected without losing nitrate, which is not possible with the hot leaching process. The cold solutions may be retained nearly saturated through occasional addition of pure water to insure against precipitation or crystallization of salts (mainly nitrate) while the solution is in storage or transit. As the solution is evaporated all vapors may be condensed as pure water to be used as an efficient leaching agent, thereby decreasing the repeated leaching of the raw material to a minimum required by impure water, without additional cost and yet securing practically complete leaching. Salts are produced from the solution during evaporation at low temperature in small independent crystals. As such they are nearly pure, but mechanically mixed, and will readily drain and the drained water may be recovered for further evaporation. When drained they can be handled by machinery. Borates, iodids and iodates are virtually kept inactive due to low temperature of leaching as well as evaporation, reducing the risk of their attacking the metal equipment of tanks, pans, pipes, etc. and of forming other compounds. The pure water may be used by preference in the making of the solution for fractional solution and crystallization, and salts obtained by this step may be made as technically pure as desired, and can be economically handled, even sacked, by well-known machinery. All latent heat in all exhaust steam from all prime movers may be regained. A rough comparison of this new process with the old hot leaching process as known to me will result as follows: approximately 50% increase of extraction of nitrate from caliche during leaching, with sodium chlorid as a by product; 50% decrease in loss of water and 50% economy in heat required. Last, but not least, the making available for profitable treatment of all old dumps of partly leached caliche, as well as other known deposits inferior in nitrate or other salts soluble in "cold" water, with a marked economy on mining cost.

By the term "cold" as applied herein to the aforesaid solution obtained by leaching the raw material, I mean such a temperature of the solution as it normally has under ordinary conditions.

Having now described my invention what I claim is:—

The method of complete leaching of desired salts out of raw material consisting in commingling raw material with a leaching agent, blowing fluid under pressure through the mixture to cause disintegration of said material in the leaching agent and the forcing of finest solid material of disintegration above the heavier solids, allowing the raw material to settle to form a filter bed with the lighter disintegrated material above the heavier material, drawing off the solution so obtained and filtering the same through the said filter bed of settled material thereby depositing all finest material of disintegration on top of the coarse material leaving said material leached and drained, forcing fresh pure leaching agent through said deposited material from below upward, blowing air through said material and leaching agent under pressure, and drawing off the solution and filtering the same through the settled material.

Signed at New York city in the county of New York, and State of New York, this 26th day of March, A. D. 1917.

WILLIAM E. GIESECKE.

Witnesses:
ABRAHAM M. GRILL,
T. F. BOURNE.